US012784396B2

(12) United States Patent
Cai et al.

(10) Patent No.: US 12,784,396 B2
(45) Date of Patent: Nov. 3, 2026

(54) BIDIRECTIONAL COMPACT DEEP FUSION NETWORKS FOR MULTIMODALITY VISUAL ANALYSIS APPLICATIONS

(71) Applicant: Intel Corporation, Santa Clara, CA (US)

(72) Inventors: Dongqi Cai, Beijing (CN); Anbang Yao, Beijing (CN); Yikai Wang, Beijing (CN); Ming Lu, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 422 days.

(21) Appl. No.: 18/031,064

(22) PCT Filed: Nov. 19, 2020

(86) PCT No.: PCT/CN2020/129939
§ 371 (c)(1),
(2) Date: Apr. 10, 2023

(87) PCT Pub. No.: WO2022/104618
PCT Pub. Date: May 27, 2022

(65) Prior Publication Data
US 2024/0005628 A1 Jan. 4, 2024

(51) Int. Cl.
*G06V 10/44* (2022.01)
*G06V 10/80* (2022.01)
*G06V 10/82* (2022.01)

(52) U.S. Cl.
CPC .......... *G06V 10/454* (2022.01); *G06V 10/806* (2022.01); *G06V 10/811* (2022.01); *G06V 10/82* (2022.01)

(58) Field of Classification Search
None
See application file for complete search history.

(56) References Cited

U.S. PATENT DOCUMENTS

2018/0032846 A1* 2/2018 Yang .................... G06V 10/811
2020/0242739 A1* 7/2020 Laine ...................... G06N 7/01
(Continued)

FOREIGN PATENT DOCUMENTS

CN 110188239 A 8/2019
CN 111104921 A 5/2020
CN 111882514 A 11/2020
(Continued)

OTHER PUBLICATIONS

Dolz et al., "Hyper Dense-Net: A Hyper-Densely Connected CNN for Multi-Modal Image Segmentation," in IEEE Transactions on Medical Imaging, vol. 38, No. 5, pp. 1116-1126, May 2019, doi: 10.1109/TMI.2018.2878669 (Year: 2019).*
(Continued)

*Primary Examiner* — Michelle M Koeth
(74) *Attorney, Agent, or Firm* — Hanley, Flight & Zimmerman, LLC

(57) ABSTRACT

Techniques related to bidirectional compact deep fusion networks for multimodal image inputs are discussed. Such techniques include applying a shared convolutional layer and independent batch normalization layers to input volumes for each modality and fusing features from the resultant output volumes in both directions across the modalities.

20 Claims, 8 Drawing Sheets

(56) References Cited

U.S. PATENT DOCUMENTS

| | | | | |
|---|---|---|---|---|
| 2021/0390288 | A1* | 12/2021 | Mittal | G06N 3/084 |
| 2023/0060131 | A1* | 3/2023 | Wang | G06N 3/045 |

FOREIGN PATENT DOCUMENTS

| | | | |
|---|---|---|---|
| WO | 2016100814 | A1 | 6/2016 |
| WO | 2019071370 | A1 | 4/2019 |

OTHER PUBLICATIONS

Ioffe et al., "Batch Normalization: Accelerating Deep Network Training by Reducing Internal Covariate Shift," Proceedings of the 32nd International Conference on Machine Learning, Lille, France, 2015. JMLR: W&CP vol. 37 (Year: 2015).*

Wang et al., "Deep Multimodal Fusion by Channel Exchanging," arXiv:2011.05005v1 [cs.CV], Nov. 10, 2020, https://doi.org/10.48550/arXiv.2011.05005 (Year: 2020).*

Vries et al., "Modulating early visual processing by language," arXiv:1707.00683v3 [cs.CV], Dec. 18, 2017, https://doi.org/10.48550/arXiv.1707.00683 (Year: 2017).*

Deng et al., "RFBNet: Deep Multimodal Networks with Residual Fusion Blocks for RGB-D Semantic Segmentation," arXiv:1907.00135v2 [cs.CV], https://doi.org/10.48550/arXiv.1907.00135, Sep. 16, 2019 (Year: 2019).*

Chen, L. et al. "Searching for efficient multi-scale architectures for dense image prediction", NeurIPS (2018).

Chen, L. et al., "Rethinking atrous convolution for semantic image segmentation", arXiv preprint arXiv:1706.05587 (2017).

Hazirbas, C. et al., "Incorporating depth into semantic segmentation via fusion-based CNN architecture", ACCV (2016).

He, K. et al., "Deep residual learning for image recognition", CVPR (2016).

Huang, X. et al., "Multimodal unsupervised image-to-image translation", ECCV (2018).

International Search Report and Written Opinion for PCT Application No. PCT/CN2020/129939, dated Aug. 18, 2021.

Ioffe, S. et al., "Batch normalization: Accelerating deep network training by reducing internal covariate shift", ICML (2015).

Joze, H.R. et al., "MMTM: Multimodal Transfer Module for CNN Fusion", CVPR (2020).

Kiela, D. et al., "Efficient large-scale multi-modal classification", AAAI (2018).

Lee, S. et al., "Rdfnet: RGB-D multi-level residual feature fusion for indoor semantics segmentation", ICCV (2017).

Lin, G. et al., "Refinenet: Multi-path refinement networks for high-resolution semantic segmentation", CVPR (2017).

Russakovsky, O. et al., "Imagenet large scale visual recognition challenge", IJCV (2015).

Silberman, N. et al., "Indoor segmentation and support inference from RGBD images", ECCV (2012).

Zeng, J. et al., "Deep surface normal estimation with hierarchical RGB-D fusion", CVPR (2019).

International Preliminary Report on Patentability from PCT/CN2020/129939 notified Jun. 1, 2023, 6 pgs.

* cited by examiner

BIDIRECTIONAL COMPACT DEEP FUSION NETWORKS FOR MULTIMODALITY VISUAL ANALYSIS APPLICATIONS

CLAIM OF PRIORITY

This Application is a National Stage Entry of, and claims priority to, PCT Application No. PCT/CN2020/129939, filed on 19 Nov. 2020 and titled "BIDIRECTIONAL COMPACT DEEP FUSION NETWORKS FOR MULTIMODALITY VISUAL ANALYSIS APPLICATIONS", which is incorporated by reference in its entirety for all purposes.

BACKGROUND

In the context of visual analysis and other applications, with the increasing availability of multimodal sensors, fusing information collected by multiple sensors (i.e., multimodal data) has shown improved performance in many contexts such as scene recognition, semantic segmentation, and others. Current multimodal training techniques provide an individual encoder branch that is specialized for each modality such that the total number of parameters for feature encoding multiplies with the increase in modalities. Furthermore, with the success of deep convolutional neural networks (CNN), CNN based feature combination techniques are used for improved accuracy.

Current techniques include those that directly send the features to the decoder side and those that apply features from one branch to another of the branches in the encoder. Such sending features to the decoder side include the RGB-D fusion network (RDFNet), which uses multi-layer features at four down-sampling stages of the residual neural network (ResNet) encoder, iteratively refines the features, and then sends the features to the decoder and the self-supervised model adaption (SSMA) network, which combines multimodal features at mid-level and high-level with an attention-based mechanism for feature calibration and also sends the features to the decoder side. Networks that apply features from one branch to another branch in the encoder include FuseNet, which trains two individual branches to learn RGB and depth features with multiple skip connections in the encoder from the depth branch to RGB branch for combination and, others, which provide similar techniques. However, such techniques require heavy network parameter loads with the increase of modalities and prevent multimodal features from implicitly fusing during joint training.

There is an ongoing need for high quality and efficient deep network models for use in multimodal visual analysis applications and others. It is with respect to these and other considerations that the present improvements have been needed. Such improvements may become critical as the implementation of CNN models in a variety of contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1A:
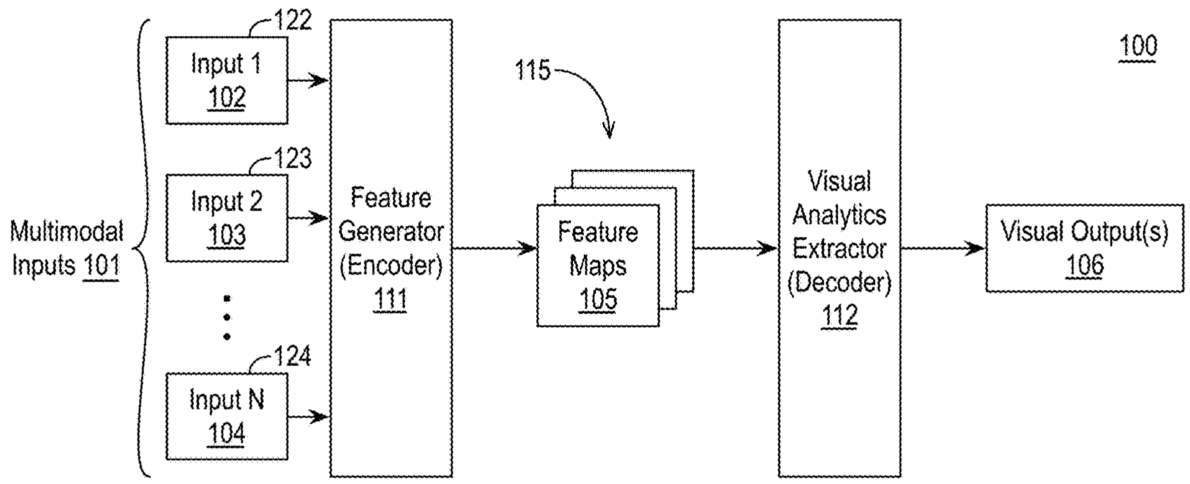
FIG. 1A illustrates an example deep neural network to provide feature maps and/or image outputs based on multimodal input images for visual analysis.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", or examples, or embodiments, etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to multimodal deep convolutional neural networks that provide convolutional layers with shared parameters, batch normalization with unshared parameters, and employ bidirectional compact deep fusion.

As described above, it is desirable to provide high quality and efficient deep network models for use in multimodal visual analysis applications. As used herein, the term multimodal indicates different inputs are provided to the network for the same scene such that different visual information for the same scene are provided by the multimodal inputs. It is noted that such information does not differ entirely but differs in the pixel level information provided from each mode. For example, the multimodal inputs may include an image having three color channels such as an RGB input image, a depth image (e.g., an image having a depth value for each pixel), a depth map, a foreground/background map, a shade image, normal data, texture data, edge data, infra red (IR) image, other suitable modal information, and combinations thereof. Notably, such multimodal information or images may be received from different sensors trained on the scene. Such multimodal information are referred to as images herein. Such multimodal images may be aligned at the pixel level such that each image has information at a pixel level for the scene. Such multimodal images may have the same pixel resolutions or they may be different.

The deep neural networks discussed herein provides features as feature maps, for example, that may be used by a subsequent network, another stage of the same network, a fully connected network, or other component to determine visual analysis image outputs corresponding to the scene. Such outputs may include scene recognition data, semantic segmentation data, image translation data, or any other visual analysis data such as person or object recognition data, etc. Such visual analysis data may be in any suitable format such as label data, probability data, or the like at any suitable resolution such as pixel resolution, small region or block level resolution, etc. or corresponding to bounding boxes, areas of interest, or the like.

The techniques discussed herein provide a bidirectional compact deep fusion (BCDFusion) framework to fuse multimodal features with the techniques including a parameter sharing scheme (PSS) and a bidirectional fusion scheme based on a cross-modality channel shuffle (CMCS) and/or a modality-specific pixel shift (MSPS). In some embodiments, first and second input volumes that correspond to first and second input images having first and second modalities are received. As discussed, the first and second modalities provide different visual information for a same scene and may include pixel level sensor data such as RGB images, depth images, shade images, etc. As used herein, the term input volume indicates a feature volume that is to be input to a network layer such as a convolutional neural network (CNN) layer. The term output volume indicates a feature volume that is output from a network layer such as a batch normalization layer. Notably, the same feature volume may be characterized as an input volume and an output volume depending on context. Furthermore, an input image may provide an input volume for the network and, therefore, input images may be characterized as input volumes. The techniques discussed herein may be applied to any such feature volumes. The parameter sharing scheme includes applying a CNN layer and a first batch normalization layer to the first input volume and applying the same CNN layer and a second (different) batch normalization layer to the second input volume. Notably, the same CNN layer is applied to both modality input volumes while different batch normalization layers (i.e., having differing activation parameters such as scale and shift parameters) are applied for the different modalities. Such a combination of parameter sharing using a shared CNN layer (i.e., encoder) and parameter independence using modality-specific batch normalization layers provides improved joint training of multimodal inputs with a linearly reduced number of parameters (1/N, where N is the number of modalities) with respect to unshared CNN layers for improved efficiency and heterogeneous feature activations for different modalities.

In addition or in the alternative, bidirectional cross-modality feature sharing may be employed to improve feature interactions. For example, features from a first output volume for the first modality may be combined with features from a second output volume for the second modality and the combined features (e.g., a new input volume characterized as a fused input volume) is then provided to a next CNN layer (with shared parameters) and batch normalization (with different parameters) for the first modality and the same techniques are used for the second modality. The combined features may be combined using cross-modality channel shuffle techniques and/or a modality-specific pixel shift techniques. In cross-modality channel shuffle, some feature maps from the second modality output volume are included in the input volume for the first modality, and vice versa. In modality-specific pixel shift some or all feature maps from the second modality output volume are pixel shifted (e.g., by one pixel in the horizontal or vertical dimension) to provide pixel-wise shifted versions of the feature maps and the pixel-wise shifted versions of the feature maps from the second modality are summed with the feature maps for the first modality, and vice versa. Notably, the pixel shifted feature maps may be outputs from the same CNN/batch normalization layer or they may be outputs from a prior CNN/batch normalization layer as is discussed further herein.

Notably, cross-modality channel shuffle strengthens the multimodal feature interactions across channels (improving holistic feature representation ability) and modality-specific pixel shift enhances the spatial feature discrimination within channels (capturing rich info at object edges, especially for small/thin objects) for improved performance on a variety of visual analysis applications or tasks. Such techniques are parameter-free in that they do not increase the number of parameters in the implemented network. Furthermore, such techniques are bidirectional and complementary properties with a multi-layer fusion design such that they may be employed in any type of encoder, encoder architecture, network architecture, etc.

FIG. 1A illustrates an example deep neural network 100 to provide feature maps and/or image outputs based on multi-modal input images for visual analysis, arranged in accordance with at least some implementations of the present disclosure. As shown in FIG. 1A, deep neural network (DNN) 100 includes a feature generator (encoder) 111 and a visual analytics extractor (decoder) 112. Feature generator 111 receives multimodal inputs 101 including input images 102, 103, 104 corresponding to differing modalities 122, 123, 124 and generates features 115 such as feature maps 105 that are used by visual analytics extractor (decoder) 112 to generate visual analytics outputs 106. Although illustrated with respect to an encoder/decoder DNN architecture, the techniques discussed herein may be employed in any DNN, CNN, or other network. DNN 100 may be implemented via any suitable device such as a personal computer, a laptop computer, a tablet, a phablet, a smart phone, a digital camera, a gaming console, a wearable device, a display device, an all-in-one device, a two-in-one device, or the like. For example, DNN 100 may provide at least a portion of a visual analytics or artificial intelligence processing pipeline that may be implemented in hardware, software, or a combination thereof. In some embodiments, DNN 100 is implemented, in an implementation phase, in hardware as a system-on-a-chip (SoC). In some embodiments, the SoC is employed as a monolithic integrated circuit (IC). As used herein, the term monolithic indicates a device that is discrete from other devices, although it may be coupled to other devices for communication and power supply.

DNN 100 receives at least two of input images 102, 103, 104 for processing such that each of input images 102, 103, 104 correspond to a different modality and include data representative of a scene. For example, input image 102 may include a three-channel input image including one channel for each color channel (e.g., RGB, YUV, etc.). Furthermore, input image 103 may include an image including different modality data such as a depth image (e.g., an image having a depth value for each pixel) and input image 104 may include another image including different modality data such as a shade image. Input images 102, 103, 104 may include any combination of input images such as a three color channel input (or a luma only image having only a luma channel), a depth image (or depth map), a disparity image (or disparity map), a shade image, normal data image (i.e., an image having a normal vector at each pixel), texture data (i.e., an image having an image texture at each pixel), edge data (i.e., an image having an edge measure such as probability or binary indicator at each pixel), a motion vector image (i.e., an image having a motion vector at each pixel), or others with N modalities being employed. Such input images 102, 103, 104 may be at the same or different resolutions.

Feature generator 111 receives input images 102, 103, 104 and generates features 115, which may include any data structure such as one or more sets of features maps 105 at any suitable resolution. For example, feature generator 111 may generate an output volume(s) or output feature volume(s) including one or more sets of features maps 105 for use by visual analytics extractor 112. Visual analytics extractor 112 receives features 115 such as feature maps 105 and any other suitable input and visual analytics extractor 112 generates visual analytics outputs 106. Visual analytics outputs 106 may include any suitable data structure indicative of a visual analysis of the pertinent scene such as scene recognition data, semantic segmentation data, image translation data, or any other visual analysis data such as person or object recognition data, etc. For example, visual analytics outputs 106 may include probabilities (on a pixel or region basis) indicative of scene features or labels, object features or labels or other detected characteristics. In some embodiments, visual analytics outputs 106 is an image such as a translated image, a super resolution image, a more detailed image, etc. Visual analytics outputs 106 may be used in any context such artificial intelligence applications, visual analysis applications, visual recognition applications, or others. For example, DNN 100 may perform any suitable task such as semantic segmentation, object and scene recognition, image translation, and others using multimodality data including RGB, depth, shade, normal, texture, edge, and others. Furthermore, DNN 100 may employ (and the components discussed herein may be employed in) any suitable network architecture such as architectures having a ResNet backbone, an Xception backbone, a U-Net backbone, or any other architecture.

Figure 1B:
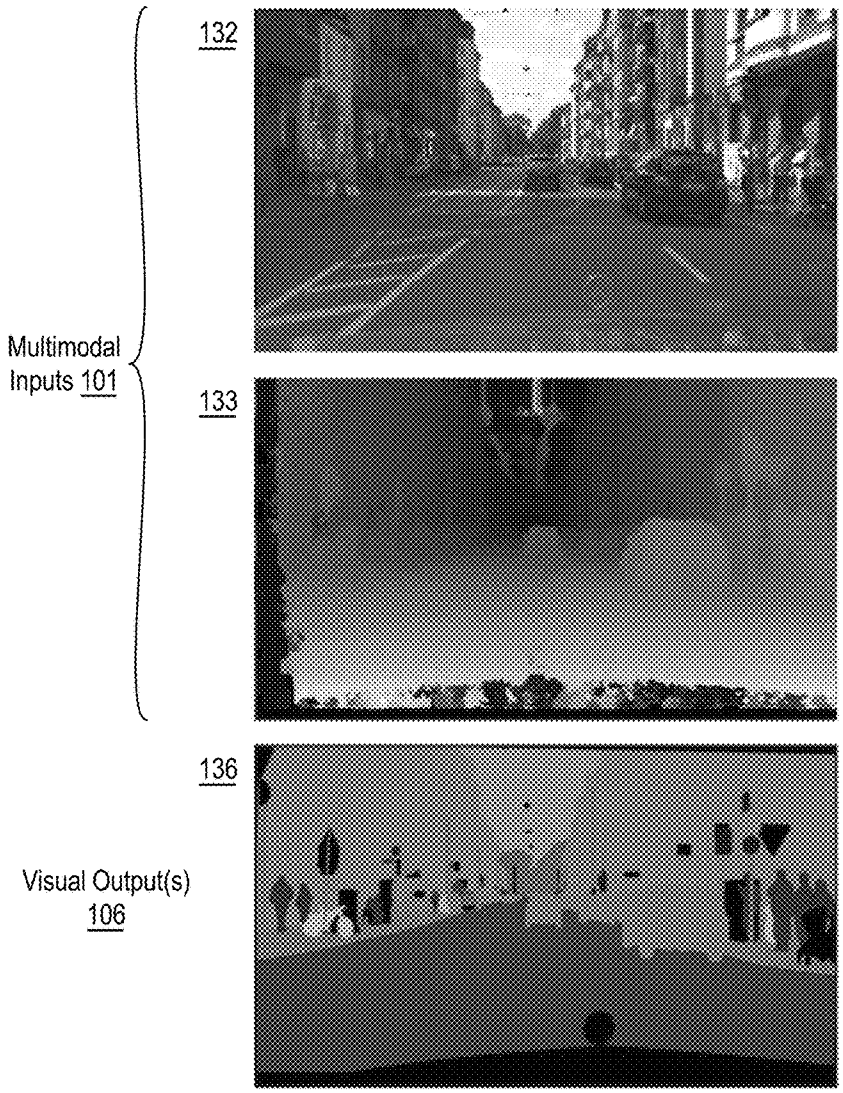
FIG. 1B illustrates example multi-modal inputs and corresponding exemplary visual analytics outputs.

FIG. 1B illustrates example multi-modal inputs 101 and corresponding exemplary visual analytics outputs 106, arranged in accordance with at least some implementations of the present disclosure. As shown in FIG. 1B, multi-modal inputs 101 may include an input image 132 such as an RGB image, a YUV image, or a luma only image and a depth image 133 where each pixel has a depth from camera value or similar depth value. As discussed, multi-modal inputs 101 may include, in addition or in the alternative, image data for other modalities including disparity image data, shade image data, normal image data, texture image data, edge image data, etc. Furthermore, based on application of DNN 100, visual analytics outputs 106 such as semantic image data 136 are generated. In the example of FIG. 1B, semantic image data 136 includes a semantic segmentation of a scene such that each pixel has a corresponding label (e.g., tree, person, road, automobile, etc.) as shown with differing shading in semantic image data 136.

Discussion now turns to details of bidirectional compact deep fusion (BCDFusion) for use in multimodal feature frameworks. Such techniques include a parameter sharing scheme as discussed with respect to FIG. 2, bidirectional feature fusion techniques as discussed with respect to FIGS. 4 and 5, which may include one or both of cross-modality channel shuffle techniques as discussed with respect to FIG. 6 and modality-specific pixel shift techniques as discussed with respect to FIG. 7. Such techniques are also discussed elsewhere herein. Notably, such techniques and components may be employed in any architecture or structure in DNN 100 and, in particular, in feature generator 111. Furthermore, the following FIG. 1 illustration portions or components of a feature generator network, an encoder network, DNN, or DNN portion that may be combined with a DNN backbone in any suitable manner.

Figure 2:
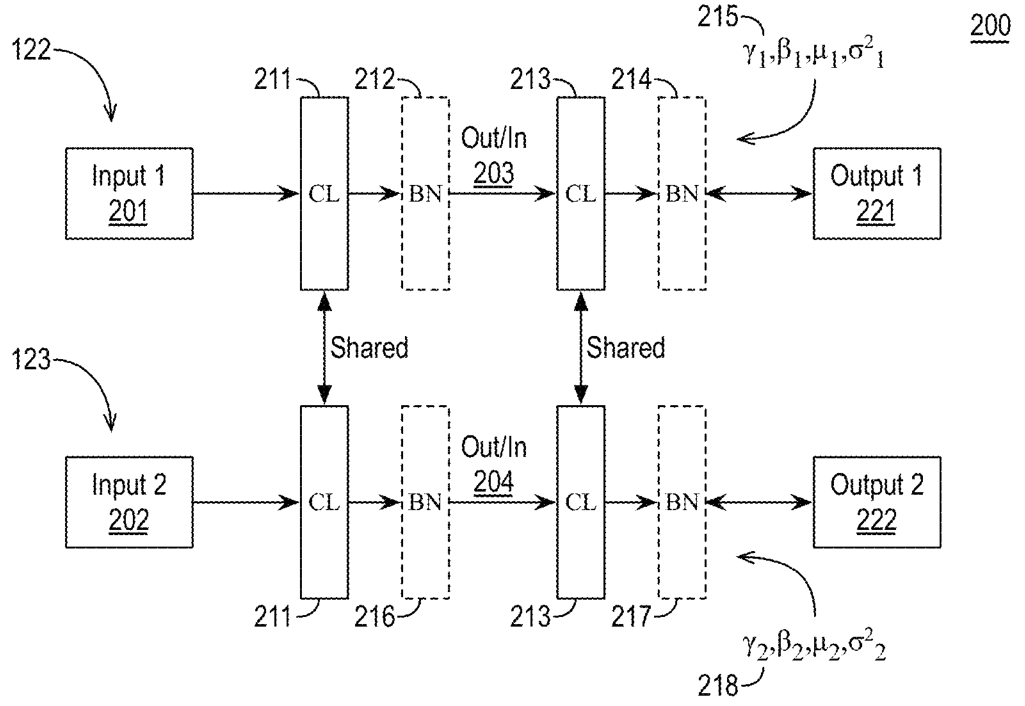
FIG. 2 illustrates an example deep neural network component to generate output feature volumes for different modalities based on input feature volumes for visual analysis

FIG. 2 illustrates an example deep neural network component 200 to generate output feature volumes 221, 222 for different modalities based on input feature volumes 201, 202 for visual analysis, arranged in accordance with at least some implementations of the present disclosure. As shown in FIG. 2, DNN component 200 includes a convolutional neural network (CNN) layer 211 (CL), a batch normalization (BN) layer 212 (BN), a CNN layer 213, a BN layer 214, a BN layer 216, and a BN layer 217. Furthermore, DNN component 200 includes a path for modality 122 (i.e., including CNN layer 211, BN layer 212, CNN layer 213, and BN layer 214) to provide a modality 122 output feature volume 221 for input volume 201 and a path for modality 123 (i.e., including CNN layer 211, BN layer 216, CNN layer 213, and BN layer 217) to provide a modality 123 output feature volume 222 for input volume 202 such that modalities 122, 123 are different as discussed herein. Input volumes 201, 202 may be output volumes from prior DNN layers or input volumes 201, 202 may be input images such as any of input images 102, 103, 104. Although illustrated with respect to two modalities 122, 123 for the sake of clarity of presentation, the techniques discussed with respect to FIG. 2 may be provided across any number of modalities. Furthermore output volumes 221, 222 may include any number of feature maps, resolutions, and other characteristics discussed with respect to feature volumes herein.

Notably, in DNN component 200, CNN layer 211, which may be characterized as a shared CNN layer, is applied to both input volume 201 corresponding to modality 122 and input volume 202 corresponding to modality 123 while different BN layers 212, 216 are applied to the outputs from CNN layer 211 for each of modalities 122, 123. That is, CNN layer 211 and BN layer 212 are applied to input volume 201 to generate an output volume 203 and (the same) CNN layer 211 and (a different) BN layer 216 are applied to input volume 202 to generate an output volume 204. Herein, the shared CNN layers 211, 213 are indicated by a solid outline while differing BN layers 212, 214, 216, 217 are indicated by a dashed outline. As used herein, the term CNN layer indicates a layer that applies a number of pretrained filter kernels to an input volume to generate an output volume. The CNN layer may optionally include other operations such as ReLu or others. The term BN layer indicates a layer that applies batch normalization to normalize (or standardize) the features of the feature volumes using batches and/or to whiten the feature results of the feature volumes. The term shared layer indicates the same or nearly the same such as >99% or >95% match of parameters are employed while the term unshared or independent layers indicates the parameters are not the same and exhibit differences such as >50% difference or >75% difference. As shown with respect to BN layers 214, 217, across modalities 122, 123, BN layer 214 applies BN parameters 215 and BN layer 217 applies different BN parameters 218, as discussed further below. The same holds for BN layers 212, 216 such that BN layer 212 applies different BN parameters (not shown) than the BN parameters (not shown) applied b BN layer 116. As shown, output volumes 203, 204 (which may now be characterized as input volumes) are both received by CNN layer 213, which may be characterized as a shared CNN layer. CNN layer 213 is applied to both volumes 203 corresponding to modality 122 and volume 204 corresponding to modality 123 while different BN layers 214, 217 are applied to the outputs from CNN layer 211 for each of modalities 122, 123. The resultant output volumes 221, 222 may be provided to a subsequent layer of a DNN or to another component for decoding.

Figure 3:
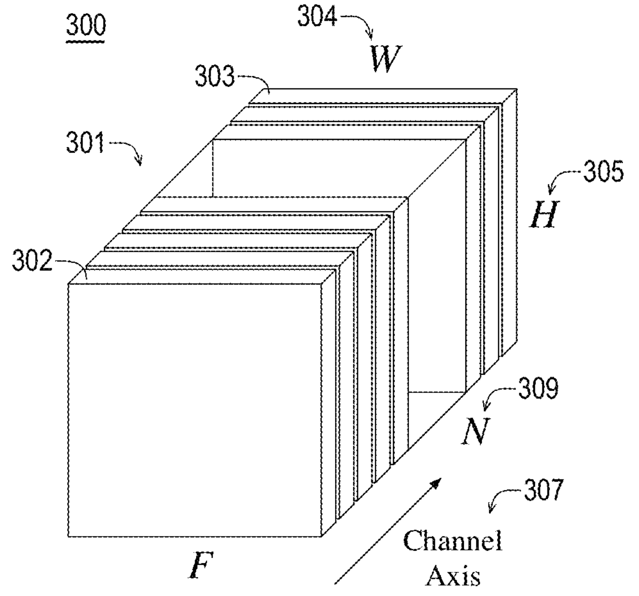
FIG. 3 illustrates an example feature volume for use in a deep neural network for visual analysis.

FIG. 3 illustrates an example feature volume 300 for use in a deep neural network for visual analysis, arranged in accordance with at least some implementations of the present disclosure. Feature volume 300 may be any input images 102, 103, 104 or any input volume, output volume, feature maps, set of feature maps, discussed herein. For example, feature volume 300 may correspond to an input image in that feature volume 300 includes the input image or was generated from the input image and feature volume 300 may correspond to a modality based on the input image correspondence to the modality. Feature volume 300, F, has any number of feature maps or input channels 309, N, (including lead feature map 302, final feature map 303 and any intervening feature maps 301) in a particular order along channel axis 307 with each having a width 304, W, and a height 305, H. Each feature map includes a number of pixels, values, feature values or the like. Therefore, feature volume 300 has a size or number of features or samples of N×H×W. Furthermore, in the context of feature volume 300, feature map 302 may be characterized as a first or lead feature map and feature map 303 may be characterized as a final or last feature map. Intervening feature maps 301 are in a predefined order along channel axis 307 that runs orthogonal to the height 305 and width 304 of feature volume 300. That is, the feature maps are in a predefined order defined by the architecture of the convolution being employed and the pretraining thereof. The predefined order is along feature volume 300 and filter kernels of the CNN filters being applied an order along channel axis 307. As discussed further below, such an order may be maintained during shuffle and pixel shift and add operations.

Returning to FIG. 2, as discussed, for modalities 122, 123, CNN layers 211, 213 having the same network parameters (or a proportion of the same network parameters such as >99% shared parameters or >95% shared parameters) are employed while BN layers 212, 214, 216, 217 having differing network parameters (or a portion of different network parameters such as >50% different network parameters or >75% different network parameters) are used. Such a parameter sharing scheme (PSS), with a shared encoder (i.e., CNN layers) and modality-specific BNs provides improved joint training using multimodal training inputs corresponding to multimodal inputs 101 with a linearly reduced number of parameters (e.g., by 1/N with respect to unique parameters for all CNN layers, where N is the number of modalities) while providing heterogeneous feature activations for different modalities 122, 123. Notably, with increasing number of modalities, the number of parameters employed is nearly unchanged (e.g., being changed only by the number of BN parameters).

As discussed, convolutional parameters are shared across modalities 122, 123 while BN parameters are modality-specific. For example, a single CNN layer 211, 213 (encoder) is trained at each layer of DNN component for multiple modalities 122, 123. In DNN component 200 (and DNN 100), the use of BN layers 212, 214, 216, 217 that are modality specific provides for modality specific feature extraction. In some embodiments, BN layers 212, 214, 216, 217 whiten activations over a mini-batch of features (e.g., of features from the preceding CNN layer) and transforms the whitened results with channel-wise affine parameters, including scale and bias, which provide the possibility of linearly transforming whitened activations to any scales. The technique of privatizing BNs, via BN layers 212, 214,

216, 217, for multimodal training provides for activation statistics of different modalities 122, 123 that are normalized separately, and channel-wise scales and biases of BN layers 212, 214, 216, 217 are also learned individually for each modality 122, 123. As discussed, network parameters apart from the BN parameters of BN layers 212, 214, 216, 217 are shared for modalities 122, 123. Notably, the parameters of shared CNN layers 211, 213 are trained together and the parameters of BN layers 212, 214, 216, 217 are trained separately. As used herein, the term trained together indicates the parameters are the same for the layers and trained using ground truth training images and outputs while the term trained separately indicates the parameters are allowed to differ during training using the ground truth data.

For example, denoting S modalities for fusion, for the $s^{th}$ modality, where $s \in \{1, 2, \ldots, S\}$, privatizing BN layers can be provided as shown in Equation (1):

$$y_s = \gamma_s \cdot \frac{x_s - \mu_s}{\sqrt{\sigma^2 + \epsilon}} + \beta_s \tag{1}$$

where $x_s$, $y_s \in \mathbb{R}^{N \times C \times H \times W}$ are, respectively, the input and output feature maps (feature volumes) of the $s^{th}$ modality, $\mu_s$, $\sigma \in \mathbb{R}^C$ are, respectively, the mean and standard deviation values of input activations over the current mini-batch of the $s^{th}$ modality, $\gamma_s$, $\beta_s \in \mathbb{R}^C$ are learnable scale and bias with respect to the $s^{th}$ modality, and E is a small constant to avoid division by zero.

The mean and standard deviation values may be determined as shown in Equations (2):

$$\mu_s = \frac{1}{NHW} \sum\nolimits_{n,h,w} x_s \qquad \sigma_s^2 = \frac{1}{NHW} \sum\nolimits_{n,h,w} (x_s - \mu_s)^2 \tag{2}$$

where N is the number of input channels, H is the height of each feature map, and W is the width of each feature map (please refer to FIG. 3).

Discussion now turns to bidirectional fusion across modalities 122, 123. Such bidirectional fusion across modalities 122, 123 includes combining features from an output volume corresponding to the modality 122 with features from an output volume corresponding to modality 123 to generate an input volume for modality 122 and combining features from the output volume corresponding to the modality 123 with features from the output volume corresponding to modality 122 to generate an input volume for modality 123. That is, features are crossed over from modality 122 to modality 123 and from modality 123 to 122, such bidirectional fusion provides for improved performance and balance during the training of modalities 122, 123. Such bidirectional fusion includes one or both of cross-modality channel shuffling (i.e., shuffling feature maps across modalities 122, 123) and modality-specific pixel shifting (i.e., pixel shifting feature maps for one of modalities 122, 123 and adding the pixel-shifted feature maps to feature maps of the other modality).

Figure 4:
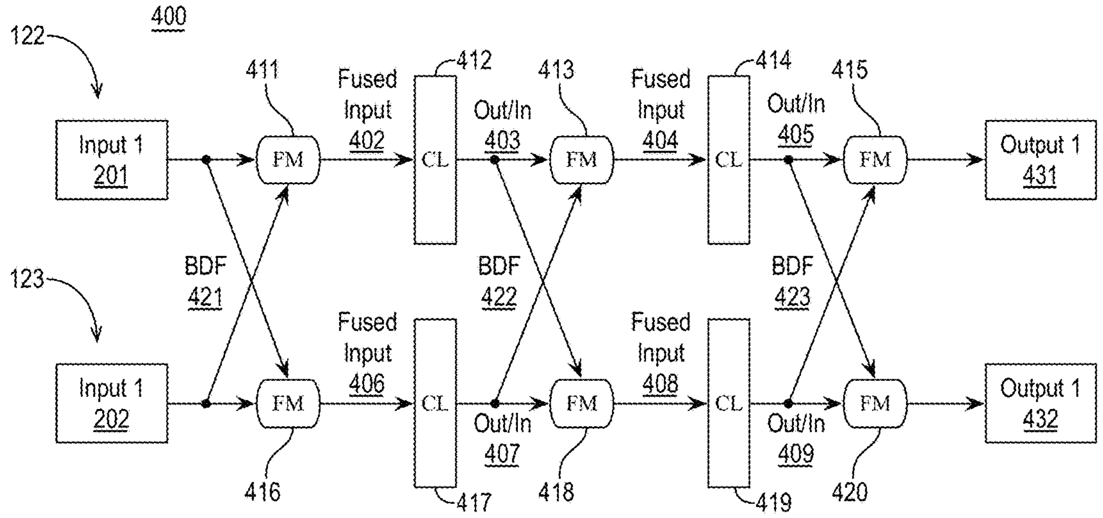
FIG. 4 illustrates an example deep neural network component to generate output feature volumes for different modalities based on input feature volumes for visual analysis using bidirectional fusion.

FIG. 4 illustrates an example deep neural network component 400 to generate output feature volumes 431, 432 for different modalities based on input feature volumes 201, 202 for visual analysis using bidirectional fusion, arranged in accordance with at least some implementations of the present disclosure. As shown in FIG. 4, DNN component 400 includes a feature merge module 411 (FM) a CNN layer 412 (CL), a feature merge module 413, a CNN layer 414, a feature merge module 415, a feature merge module 416, CNN layer 417, a feature merge module 418, a CNN layer 419, and a feature merge module 420. Furthermore, DNN component 400 includes a path for modality 122 (i.e., including feature merge module 411, CNN layer 412, feature merge module 413, CNN layer 414, and feature merge module 415) to provide a modality 122 output feature volume 431 and a path for modality 123 (i.e., including feature merge module 416, CNN layer 417, feature merge module 418, CNN layer 419, and feature merge module 420) to provide a modality 123 output feature volume 432 for input volume 202 such that modalities 122, 123 are different as discussed herein. As discussed above, input volumes 201, 202 may be output volumes from prior DNN layers or input volumes 201, 202 may be input images such as any of input images 102, 103, 104. Although illustrated with respect to two modalities 122, 123 for the sake of clarity of presentation, the techniques discussed with respect to FIG. 4 may be provided across any number of modalities. Furthermore, output volumes 431, 432 may include any number of feature maps, resolutions, and other characteristics discussed with respect to feature volumes herein.

Notably, in DNN component 400, prior to application of CNN layer 412, features from input volume 202 are fused with features from input volume 201 by feature merge module 411 to generate a fused input volume 402 and, prior to application of CNN layer 417, features from input volume 201 are fused with features from input volume 202 by feature merge module 416 to generate a fused input volume 406. Thereby, bidirectional fusion 421 is provided across modalities 122, 123 prior to application of CNN layers 412, 417. Such bidirectional fusion 421 (and bidirectional fusion 422, 423) may employ any fusion techniques discussed herein such as a cross-modality channel shuffle techniques and/or modality-specific pixel shift techniques as discussed herein below.

As shown, CNN layer 412 is then applied to fused input volume 402 to generate an output and input volume 403 corresponding to modality 122 (i.e., an output from CNN layer 412 and an input for later layers of DNN component 400). Output and input volume 403 (as well as output and input volumes 407, 405, 409) may have any feature volume characteristics discussed herein. Furthermore, CNN layer 417 is applied to fused input volume 406 to generate an output and input volume 407 corresponding to modality 123 (i.e., an output from CNN layer 417 and an input for later layers of DNN component 400).

Bidirectional fusion 422, as discussed, is then applied based on output and input volumes 403, 407 prior to application of CNN layer 414, 419. For example, features from output and input volume 403 are fused with features from output and input volume 407 by feature merge module 413 to generate a fused input volume 404 and features from output and input volume 407 are fused with features from output and input volumes 403 by feature merge module 418 to generate a fused input volume 408. Thereby, bidirectional fusion 421 is again provided across modalities 122, 123 prior to application of CNN layers 414, 419. As discussed, such bidirectional fusion 422 may include cross-modality channel shuffle techniques and/or modality-specific pixel shift techniques.

CNN layer 414 is then applied to fused input volume 404 to generate an output and input volume 405 corresponding to modality 122 (i.e., an output from CNN layer 414 and an input for later layers of DNN component 400 or DNN 100).

Similarly, CNN layer 419 is applied to fused input volume 408 to generate an output and input volume 409 corresponding to modality 123 (i.e., an output from CNN layer 419 and an input for later layers of DNN component 400). Bidirectional fusion 423 is then applied based on output and input volumes 405, 409 to generate output volume 431 for modality 122 and output volume 432 for modality 123. In some embodiments, features from output and input volume 405 are fused with features from output and input volume 409 by feature merge module 415 to generate output volume 431 and features from output and input volume 409 are fused with features from output and input volumes 405 by feature merge module 420 to generate output volume 432. Thereby, bidirectional fusion 421 is again provided across modalities 122, 123 As discussed, such bidirectional fusion 422 may include cross-modality channel shuffle techniques and/or modality-specific pixel shift techniques. In some embodiments, no bidirectional fusion is provided prior to providing output volumes 431, 432.

As discussed, bidirectional fusions 421, 422, 423 may employ cross-modality channel shuffle techniques and/or modality-specific pixel shift techniques as discussed further herein below. In some embodiments, each of bidirectional fusions 421, 422, 423 employs the same techniques. In some embodiments, bidirectional fusions 421, 422, 423 use different techniques. In some embodiments, bidirectional fusion 421 performs cross-modality channel shuffle techniques and modality-specific pixel shift techniques while later bidirectional fusions 422, 423 use only cross-modality channel shuffle techniques. In some embodiments, bidirectional fusion 421 performs cross-modality channel shuffle techniques and modality-specific pixel shift techniques, bidirectional fusion 422 use only modality-specific pixel shift techniques, and bidirectional fusion 423 uses only cross-modality channel shuffle techniques.

Figure 5:
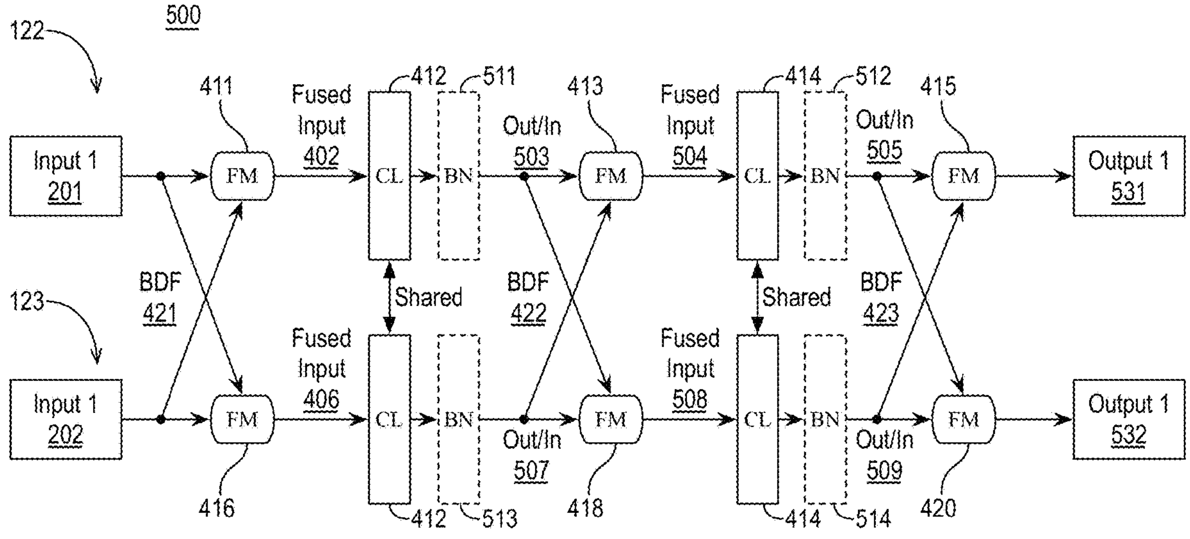
FIG. 5 illustrates an example deep neural network component to generate output feature volumes for different modalities based on input feature volumes for visual analysis using bidirectional fusion and shared CNN layers with modality-specific batch normalization.

FIG. 5 illustrates an example deep neural network component 500 to generate output feature volumes 531, 532 for different modalities based on input feature volumes 201, 202 for visual analysis using bidirectional fusion and shared CNN layers with modality-specific batch normalization, arranged in accordance with at least some implementations of the present disclosure. As shown in FIG. 5, DNN component 500 is similar to DNN component 400 with the exception that CNN layers 412, 414 are shared across modalities 122, 123 and subsequent to CNN layers 412, 414, modality specific BN layers 511, 512, 513, 514 are employed (i.e., BN layer 511 for modality 122 after shared CNN layer 412, BN layer 512 for modality 122 after shared CNN layer 414, BN layer 513 for modality 123 after shared CNN layer 412, and BN layer 514 for modality 123 after shared CNN layer 414). Such shared CNN layers and modality specific BN layers are employed as discussed with respect to FIG. 2. In other aspects, DNN component 500 operates as discussed with respect to DNN component 500.

For example, in DNN component 500, prior to application of shared CNN layer 412, features from input volume 202 are fused with features from input volume 201 by feature merge module 411 to generate fused input volume 402 and features from input volume 201 are fused with features from input volume 202 by feature merge module 416 to generate a fused input volume 406. Shared CNN layer 412 and BN layer 511 are then applied to fused input volume 402 to generate output and input volume 503 corresponding to modality 122. Furthermore, CNN layer and BN layer 513 are applied to fused input volume 406 to generate an output and input volume 507 corresponding to modality 123.

Bidirectional fusion 422 is then applied based on output and input volumes 503, 507 prior to application of shared CNN layer 414. Features from output and input volume 503 are fused with features from output and input volume 507 by feature merge module 413 to generate a fused input volume 504 and features from output and input volume 507 are fused with features from output and input volumes 503 by feature merge module 418 to generate a fused input volume 508 to provide bidirectional fusion 421 across modalities 122, 123. Shared CNN layer 414 and BN layer 512 are applied to fused input volume 504 to generate an output and input volume 505 corresponding to modality 122 and shared CNN layer 414 and BN layer 514 are applied to fused input volume 408 to generate an output and input volume 409 corresponding to modality 123. Bidirectional fusion 423 may then then be applied based on output and input volumes 505, 509 to generate output volume 531 for modality 122 and output volume 532 for modality 123. In some embodiments, features from output and input volume 505 are fused with features from output and input volume 509 by feature merge module 415 to generate output volume 531 and features from output and input volume 509 are fused with features from output and input volumes 505 by feature merge module 420 to generate output volume 532. In some embodiments, no bidirectional fusion is provided prior to providing output volumes 531, 532.

As discussed, such bidirectional fusion may employ cross-modality channel shuffle techniques and/or modality-specific pixel shift techniques. Discussion now turns to such techniques.

Figure 6:
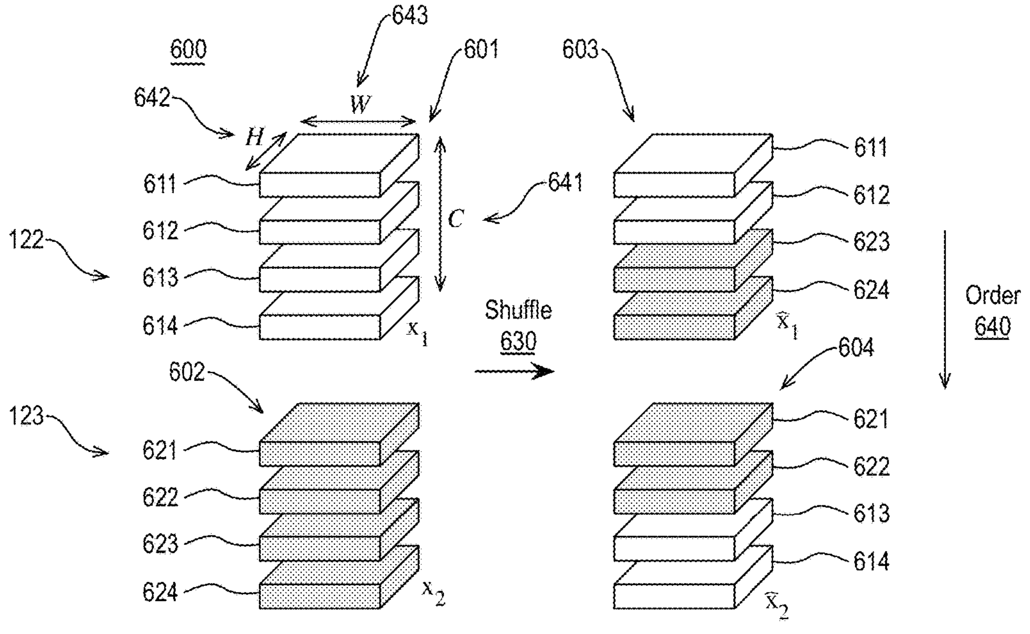
FIG. 6 illustrates an example deep neural network cross-modality channel shuffle for use in a deep neural network for visual analysis.

FIG. 6 illustrates an example deep neural network cross-modality channel shuffle 600 for use in a deep neural network for visual analysis, arranged in accordance with at least some implementations of the present disclosure. As shown in FIG. 6, input volume 601 for modality 122 and input volume 602 for modality 123 are received for processing. Input volumes 601, 602 may be any suitable feature volumes discussed herein such as volumes 201, 202, 403, 407, 405, 409, 503, 507, 505, 509 and output volumes 603, 504 may be any suitable feature volumes discussed herein such as volumes 402, 404, 431, 406, 408, 432. Notably, such volumes are to be combined across modalities 122, 123 for further processing by a DNN. Input volume 601 includes any number of feature maps such as feature maps 611, 612, 613, 614 and input volume 602 includes the same number of feature maps such as feature maps 621, 622, 623, 624. Although illustrated with four feature maps for each of input volumes 601, 602, any number of feature maps may be used.

Feature maps 611, 612, 613, 614 are shuffled with feature maps 621, 622, 623, 624 via shuffle operation 630. Notably, shuffle operation 630 shuffles feature maps across modalities 122, 123 while maintaining an order 640. Shuffle operation 630 may shuffle or swap any number of feature maps across modalities 122, 123 and such shuffled or swapped feature maps may be adjacent in order 640 (as shown) or they may have non-shuffled feature maps interspersed therebetween.

As shown, in some embodiments, feature maps 611, 612 from input volume 601 and feature maps 623, 624 from input volume 602 are combined to form a fused input volume 603 for modality 122 that is a concatenation of feature maps 611, 612, 623, 624 and, similarly, feature maps 621, 622 from input volume 602 and feature maps 613, 614 from input volume 601 are combined to form a fused input volume 604 for modality 123 that is a concatenation of feature maps 621, 622, 613, 614. In some embodiments, feature maps 611, 612, 613, 614 of input volume 601, feature maps 621, 622, 623, 624 of input volume 602, feature maps

611, 612, 623, 624 of fused input volume 603, and feature maps 621, 622, 613, 614 of fused input volume 604 are all in a predefined order 640 such that the order along channels 641 is maintained. As discussed with respect to FIG. 3, predefined order 640 is along a channel axis of channels 641 that runs orthogonal to height 642 and width 643 of feature volumes 601, 602, 603, 604 (such features are only illustrated with respect to feature volume 601 for the sake of clarity) such that the feature maps are in a predefined order defined by the architecture of the convolution being employed and the pretraining thereof.

In some embodiments, as illustrated, shuffle operation 630 shuffles or swaps a range of feature maps from one input volume that begins at one end of order 640 to a point within order 640 and vice versa. In other embodiments, shuffle operation 630 shuffles or swaps some feature maps from within order 640 (e.g., swapping feature maps 612, 613 with feature maps 622, 623). In some embodiments, shuffle operation 630 shuffles or swaps a particular frequency of feature maps in a predefined pattern such as every other feature map (e.g., swapping feature maps 611, 613 with feature maps 621, 623), every third feature map, or every fourth feature maps. Other combinations are available. Notably, shuffle operation 630 provides bidirectional fusion across modalities 122, 123 such that multimodal features of different encoder branches are merged mutually to provide rich feature interactions in the DNN. Furthermore, cross-modality channel shuffle 600 is parameter-free in that it does not increase the number of parameters in the implemented network.

For example, to strengthen the multimodal feature interactions across modalities for improved holistic feature representation ability, cross-modality channel shuffle 600 is employed. As shown in FIG. 6, given input volume 601 ($x_1$) and input volume 602 ($x_2$) such that $x_1, x_2 \in \mathbb{R}^{C\times H\times W}$ and including any number of feature maps (e.g., C feature maps) with input volume 601 including feature maps 611, 612, 613, 614 and input volume 602 including feature maps 621, 622, 623, 624. In some embodiments, shuffle operation 630 fuses or concatenates features form input volumes 601, 602 by exchanging features corresponding to a contiguous portion of the channels as illustrated. In some embodiments, a channel split point T is predefined or determined such that $1<T<C$ and $T\in\mathbb{Z}$. Using split point T, shuffle operation 630 may then be defined as shown in Equations (3):

$$\mathcal{F}(x_1,x_2)=x_1[1, \ldots T] \| x_2[T+1, \ldots ,C]$$

$$\mathcal{F}(x_2,x_1)=x_2[1, \ldots T] \| x_1[T+1, \ldots ,C] \quad (3)$$

where $x_1$ is input volume 601, $x_2$ is input volume 602, $\mathcal{F}$ provides a fusing operation, T is the split point, || indicates a channel-wise concatenation operation, 1, . . . , T and T+1, . . . , C indicate channel indices, and C is the number of channels in each of input volume 601, 602.

Notably, employing cross-modality channel shuffle 600 does not require the addition of any parameters for deployment. Furthermore, cross-modality channel shuffle 600 provides for features, after shuffle operation 630, that have no overlap and, therefore, cross-modality channel shuffle 600 is straightforward to implement and computationally efficient. Such cross-modality channel shuffle 600 may be employed via any of feature merge modules 411, 413, 415, 416, 418, 420 or any other fusion discussed herein.

Figure 7:
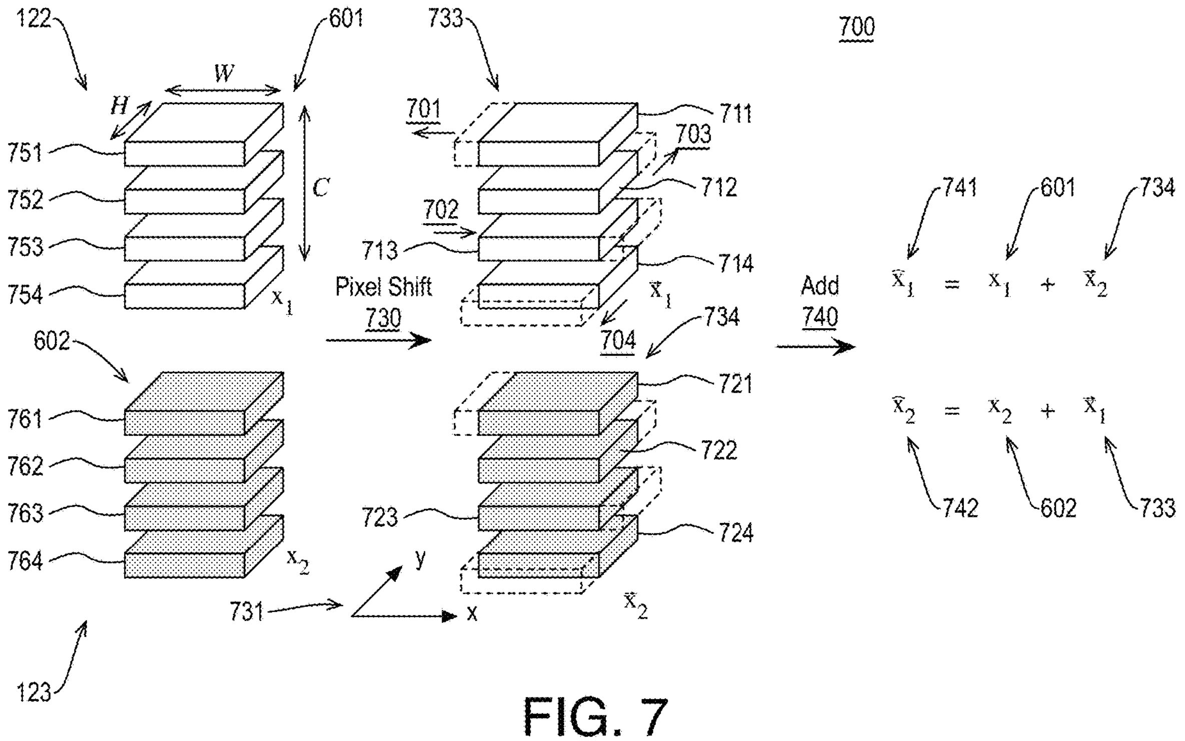
FIG. 7 illustrates an example deep neural network modality-specific pixel shift feature fusion for use in a deep neural network for visual analysis.

FIG. 7 illustrates an example deep neural network modality-specific pixel shift feature fusion 700 for use in a deep neural network for visual analysis, arranged in accordance with at least some implementations of the present disclosure. As shown in FIG. 7, input volume 601 for modality 122 and input volume 602 for modality 123 are received for processing. As discussed, input volumes 601, 602 may be any suitable feature volumes discussed herein such as volumes 201, 202, 403, 407, 405, 409, 503, 507, 505, 509 and output volumes 603, 504 may be any suitable feature volumes discussed herein such as volumes 402, 404, 431, 406, 408, 432. Notably, such volumes are to be combined across modalities 122, 123 by pixel shift operation 730 and add operation 740 for further processing by a DNN. Input volume 601 includes any number of feature maps that may be divided into feature map groups 751, 752, 753, 754 and input volume 602 includes the same number of feature maps divided into feature map groups 761, 762, 763, 764. Each feature map group 751, 752, 753, 754, 761, 762, 763, 764 may include the same number of feature maps. For example, each feature map group may include C/4 feature maps.

Feature map group 751, 752, 753, 754 and feature map groups 761, 762, 763, 764 are pixel-wise shifted via pixel shift operation 730 to generate pixel-shifted feature map groups 711, 712, 713, 714 (of a pixel-shifted feature volume 733) and pixel-shifted feature map groups 721, 722, 723, 724 (of a pixel-shifted feature volume 734). In the illustrated embodiment, pixel shift operation 730 shifts each of f feature map groups 751, 752, 753, 754, 761, 762, 763, 764 by one pixel each with each being shifted in one of four directions 701, 702, 703, 704. In some embodiments, pixel shift operation 730 shifts each feature map group by two or three pixels in each direction. Furthermore, as shown, in the illustrated embodiment, feature map groups 751, 761 are shifted in the negative x-direction (e.g., in a first horizontal dimension in a feature map space) relative to coordinate system 731, feature map groups 752, 762 are shifted in the positive y-direction (e.g., in a first vertical dimension in a feature map space) relative to coordinate system 731, feature map groups 753, 763 are shifted in the positive x-direction (e.g., in a second horizontal dimension in a feature map space opposite the first horizontal dimension) relative to coordinate system 731, and feature map groups 754, 764 are shifted in the negative y-direction (e.g., in a second vertical dimension in a feature map space opposite the first vertical dimension) relative to coordinate system 731. Such pixel shifting advantageously provides for orthogonal pixel shifts between adjacent feature map groups and opposite pixel shifts for every other feature map group.

Although illustrate with respect to orthogonal pixel shifts between adjacent feature map groups and opposite pixel shifts for every other feature map group, other pixel shift techniques may be used. In some embodiments, adjacent feature map groups are pixel shifted in opposite directions with the direction changing to an orthogonal direction after each pair of feature map groups. For example, feature map groups 751, 761 may be shifted in the negative x-direction, feature map groups 752, 762 may be shifted in the positive x-direction, feature map groups 753, 763 may be shifted in the positive y-direction, and feature map groups 754, 764 may be shifted in the negative y-direction. In some embodiments, such pixel shift patterns are provided along the channel direction but the number of shifted pixels changes. Such number of pixel shifting changes may alternative between adjacent feature map groups (e.g., in a 1 pixel shift, 2 pixel shift, 1 pixel shift, 2 pixel shift pattern). In some embodiments, such patterning is provided along channel C at the feature map level. For example, such pixel shift patterns may be applied only to individual feature maps and shift patterns may be employed along channel C. In other embodiments, more than four feature map groups may be used and such patterns may be used across any number of feature map groups.

After pixel shift operation 730, add operation 740 provides cross fusion via summation of feature map groups 751, 752, 753, 754 (i.e., non-shifted feature map groups of input volume 601) and pixel-shifted feature map groups 721, 722, 723, 724 (i.e., pixel-shifted feature volume 734) to generate a fused input volume 741 and cross fusion via summation of feature map groups 761, 762, 763, 764 (i.e., non-shifted feature maps of input volume 602) and pixel-shifted feature maps 711, 712, 713, 714 (i.e., pixel-shifted feature volume 733) to generate a fused input volume 742. It is noted that, in the context of modality-specific pixel shift feature fusion 700, input volumes 601, 602 may be from the same layer of a DNN or they be from different layers, as discussed further with respect to FIG. 8.

For example, to enhance the spatial feature discrimination within channels in order to capture rich info at object edges, particularly for small/thin objects, modality-specific pixel shift feature fusion 700. As shown in FIG. 7, modality-specific pixel shift feature fusion 700 includes pixel shift operation 730 and add operation 740. For modality-specific pixel shift feature fusion 700, feature maps of input volumes 601, 602 may be divided into groups of four feature map groups, each having C/4 channels, and each feature map group may be shifted by one pixel in one of four spatial directions. Such processing via pixel shift operation 730 may be provided as shown in Equations (4):

$$\vec{x}_1[c,h,w]=\mathcal{O}(x_1)[c,h+\alpha_c+1,w+\beta_c+1]$$

$$\vec{x}_2[c,h,w]=\mathcal{O}(x_2)[c,h+\alpha_c+1,w+\beta_c+1]$$

$$\alpha_c=[0,-1,0,1]_{\lfloor c/4\rfloor},\beta_c=[-1,0,1,0]_{\lfloor c/4\rfloor} \quad (4)$$

where $\vec{x}_1$ is pixel-shifted feature volume 733, $\vec{x}_2$ is pixel-shifted feature volume 734, $\mathcal{O}(\cdot)$ indicates a zero padding, $\alpha_c$ and $\beta_c$ are position indicators, and adding one pixel on position indicators in Equations (4) is due to the zero padding.

Subsequent to pixel shift operation 730, each fused feature volume is obtained by adding the original features for one modality and the shifted features of the other modality as shown in Equations (5):

$$\mathcal{F}(x_1,x_2)=x_1+\vec{x}_2$$

$$\mathcal{F}(x_2,x_1)=x_2+\vec{x}_1 \quad (5)$$

where $x_1$ is input volume 601, $x_2$ is input volume 602, $\mathcal{F}$ provides a fusing operation, $\vec{x}_1$ is pixel-shifted feature volume 733, and $\vec{x}_2$ is pixel-shifted feature volume 734.

As with cross-modality channel shuffle 600, modality-specific pixel shift feature fusion 700 does not require the addition of any parameters for deployment. Furthermore, modality-specific pixel shift feature fusion 700 is computationally efficient (as measured in floating point operations per second) while providing feature interactions across modalities 122, 123.

Figure 8:
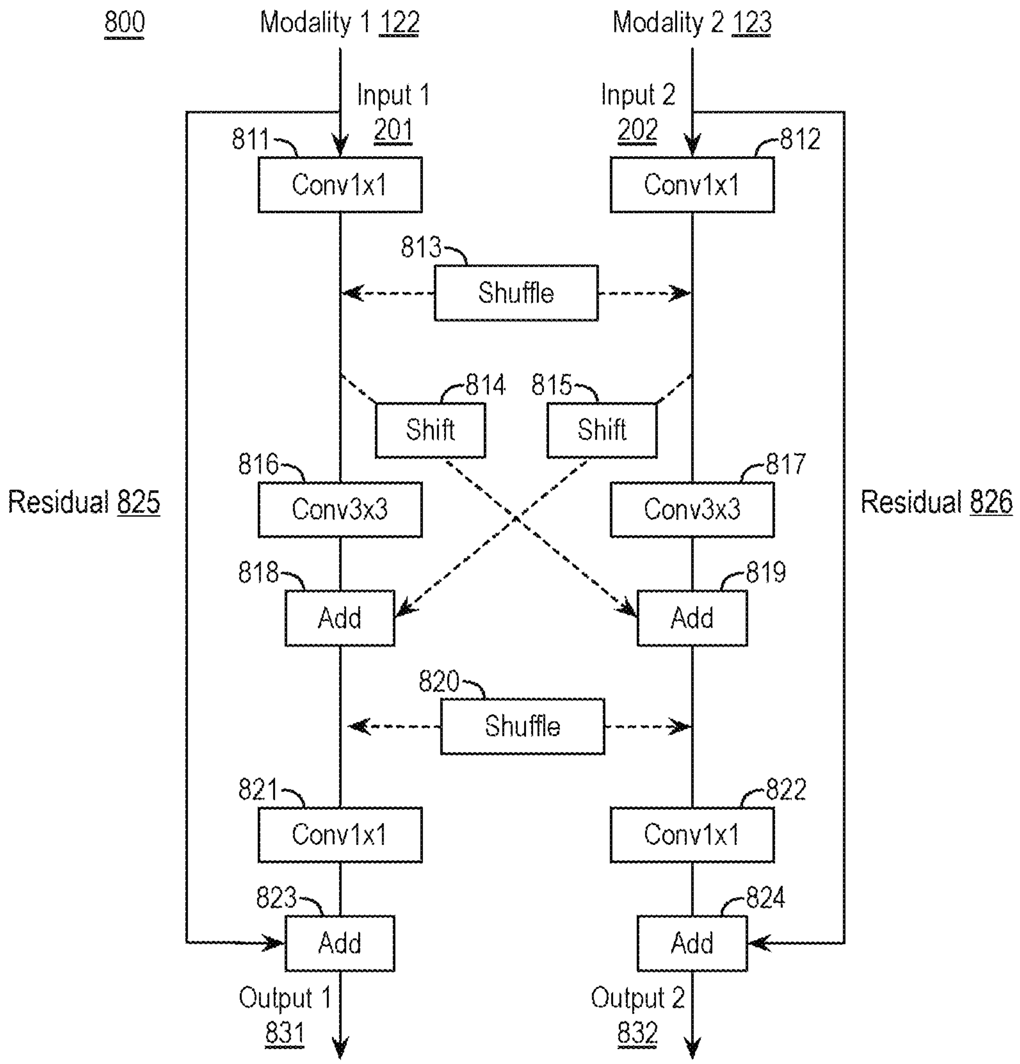
FIG. 8 illustrates an example deep neural network component to generate output feature volumes for different modalities based on input feature volumes for visual analysis using bidirectional fusion.

FIG. 8 illustrates an example deep neural network component 800 to generate output feature volumes 831, 832 for different modalities based on input feature volumes 201, 202 for visual analysis using bidirectional fusion, arranged in accordance with at least some implementations of the present disclosure. As shown in FIG. 8, DNN component 800 includes CNN/BN layers 811, 812 (Conv1x1), CNN/BN layers 816, 817 (Conv3x3), and CNN/BN layers 821, 822, (Conv1x1) some or all of which may employ shared CNN layers and independent BN layers as discussed with respect to FIG. 5 and elsewhere herein (with the term Cony layer being used as shorthand for both operations), shuffle modules 813, 820, which employ cross-modality channel shuffle techniques as discussed with respect to FIG. 6 and elsewhere herein, shift modules 814, 815 and corresponding add modules 818, 819, which employ modality-specific pixel shift feature fusion techniques as discussed with respect to FIG. 7 and elsewhere herein, and residual data 825, 826 and add modules 823, 824 that carry forward and fuse residual data. In some embodiments, shared CNN layers and independent BN layers may not be employed for one or more of CNN/BN layers 811, 812, 816, 817, 821, 822. Notably, deep neural network component 800 employs one or more of parameter sharing, cross-modality shift, and modality-specific pixel shift feature fusion into a residual DNN block.

For example, input volume 201 may be received by CNN/BN layer 811, which performs a shared convolution and an independent BN to generate a feature volume for modality 122 (not shown) and input volume 202 may be received by CNN/BN layer 812, which performs the shared convolution and an independent BN to generate a feature volume for modality 123. Such feature volumes are then shuffled as shown with respect to shuffle module 813 using techniques discussed with respect to cross-modality channel shuffle 600. The resultant feature volumes from shuffle module 813 are then received by CNN/BN layer 816, which performs a shared convolution and an independent BN to generate a feature volume for modality 122 and CNN/BN layer 817, respectfully, which performs the shared convolution and an independent BN to generate a feature volume for modality 123. Furthermore, the resultant feature volumes from CNN/BN layers 811, 812 are also pixel-wise shifted as discussed with respect to pixel shift operation 730 by shift modules 814, 815.

As shown, the feature volume from CNN/BN layer 816 and the pixel-shifted input volume from shift module 815 are then combined by add module 818. In the same manner, the feature volume from CNN/BN layer 817 and the pixel-shifted input volume from shift module 814 are then combined by add module 818. The resultant feature volumes from add modules 818, 819 are optionally shuffled via shuffle module 820 and the resultant feature volumes are provided to CNN/BN layers 821, 822. CNN/BN layer 821 performs a shared convolution and an independent BN to generate a feature volume for modality 122 and CNN/BN layer 822 performs the shared convolution and an independent BN to generate a feature volume for modality 123. The resultant feature volumes are combined with residual data 825, 826, by add modules 823, 824, respectfully to provide output volumes 831, 832.

Notably, FIG. 8 illustrates how shared convolutions and independent batch normalizations and bidirectional fusion via cross-modality channel shuffle and modality-specific pixel shift feature fusion may be implemented in a sample residual block using a block backbone or architecture such as a ResNet backbone or architecture. As discussed, shared convolutions and independent batch normalizations and bidirectional fusion via cross-modality channel shuffle and modality-specific pixel shift feature fusion may be implemented in any suitable context. In the context of deep neural network component 800, as CNN/BN layers 811, 812 (e.g., the first Conv1x1 layer in each residual block) performs compression on the channel dimension, adding a shuffle operation (as provided by shuffle modules 813, 820) and a shift operation (as provided by shift modules 814, 815)

between the two Conv1x1 layers (the other as applied by CNN/BN layers 821, 822), where features have fewer channels, leads to lower information loss during fusion. In the illustrated example, two shuffle operations (as provided by shuffle modules 813, 820) are employed for a more sufficient channel fusion with the two shuffle operations the first Conv1x1 layer (CNN/BN layers 811, 812) and before the last Conv1x1 layer (CNN/BN layers 821, 822), respectively. In addition, shift operations are inserted after the first shuffle. Notably, it has been found empirically that adding the shifted features to features after the Conv3x3 layers (CNN/BN layers 816, 817) provides improved performance. Although the pixel shift operation constantly shifts one pixel on a feature map, the corresponding shift of the original image varies according to the feature map size. In some embodiments, to mix different extents of side effects caused by pixel shifts, such fusion approaches are employed at every down-sampling stage of a network such as DNN 100.

Figure 9:
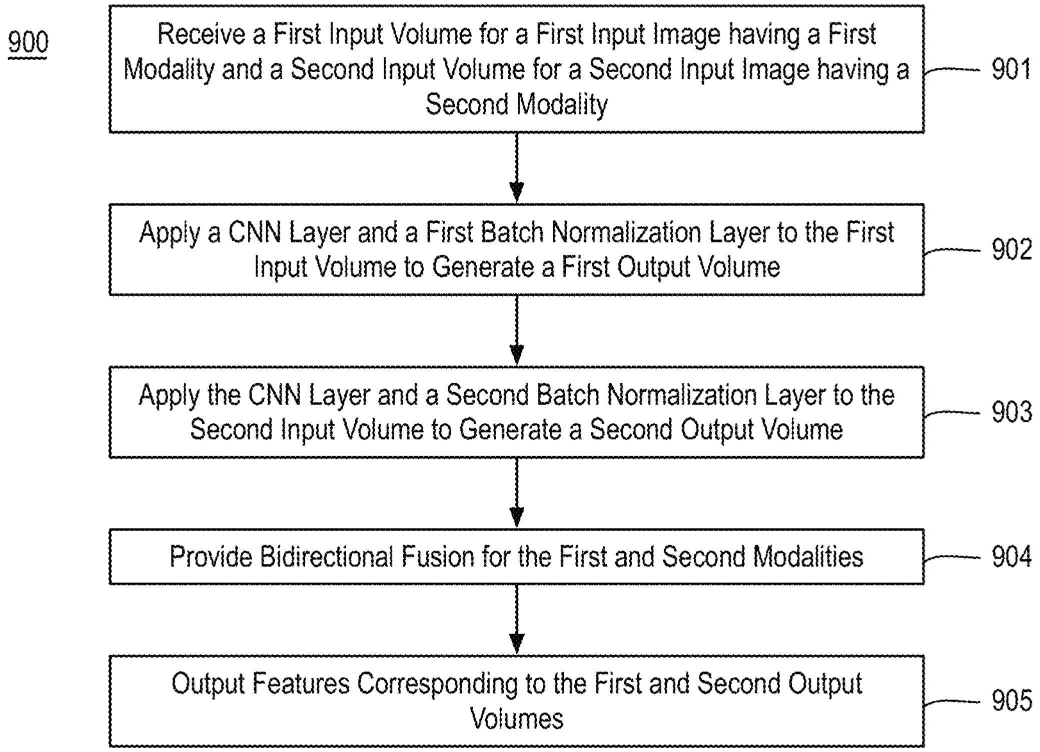
FIG. 9 is a flow diagram illustrating an example process for applying a deep neural network for visual analysis.

FIG. 9 is a flow diagram illustrating an example process 900 for applying a deep neural network for visual analysis, arranged in accordance with at least some implementations of the present disclosure. Process 900 may include one or more operations 901-905 as illustrated in FIG. 9. Process 900 may form at least part of a visual analytics application, artificial intelligence application, visual recognition application, or other application. By way of non-limiting example, process 900 may form at least part of image processing performed by DNN 100 in an implementation phase of DNN 100 (i.e., after a training phase). Furthermore, process 900 will be described herein with reference to system 1000 of FIG. 10.

Figure 10:
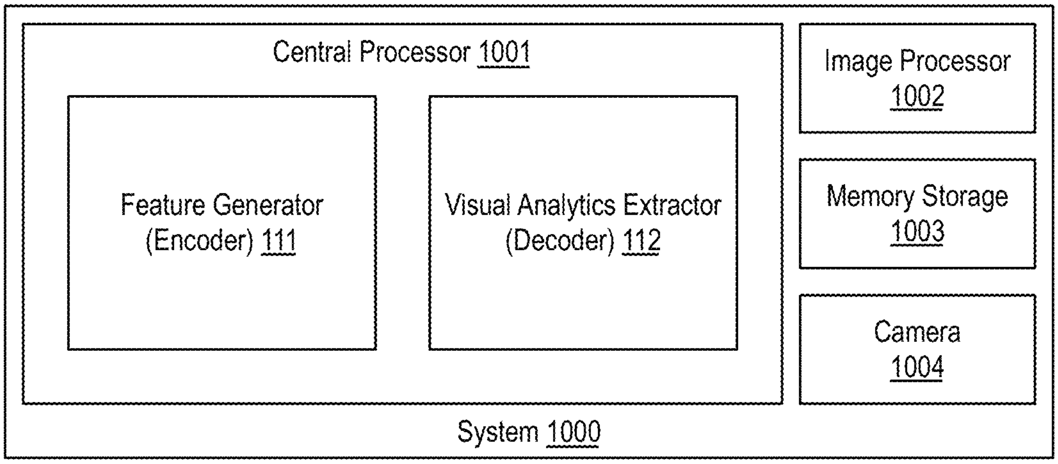
FIG. 10 is an illustrative diagram of an example system for applying a deep neural network for visual analysis.

FIG. 10 is an illustrative diagram of an example system 1000 for applying a deep neural network for visual analysis, arranged in accordance with at least some implementations of the present disclosure. As shown in FIG. 10, system 1000 may include a central processor 1001, an image processor 1002, a memory storage 1003, and a camera 1004. For example, camera 1004 may acquire input images for processing. Also as shown, central processor 1001 may include or implement feature generator (encoder) 111 and visual analytics extractor (decoder) 112. System 1000 may also include or implement any modules, layers, or components as discussed herein. Memory storage 1003 may store input images, feature maps, feature volumes, DNN parameters, convolutional layer parameters, batch normalization layer parameters, visual analytics outputs, or any other data discussed herein.

As shown, in some examples, feature generator (encoder) 111 and visual analytics extractor (decoder) 112 are implemented via central processor 1001. In other examples, one or more or portions of feature generator (encoder) 111 and visual analytics extractor (decoder) 112 are implemented via image processor 1002, a video processor, a graphics processor, or the like. In yet other examples, one or more or portions of feature generator (encoder) 111 and visual analytics extractor (decoder) 112 are implemented via an image or video processing pipeline or unit.

Image processor 1002 may include any number and type of graphics, image, or video processing units that may provide the operations as discussed herein. In some examples, image processor 1002 is an image signal processor. For example, image processor 1002 may include circuitry dedicated to manipulate image data obtained from memory storage 1003. Central processor 1001 may include any number and type of processing units or modules that may provide control and other high level functions for system 1000 and/or provide any operations as discussed herein. Memory storage 1003 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory storage 1003 may be implemented by cache memory.

In an embodiment, one or more or portions of feature generator (encoder) 111 and visual analytics extractor (decoder) 112 are implemented via an execution unit (EU) of image processor 1002. The EU may include, for example, programmable logic or circuitry such as a logic core or cores that may provide a wide array of programmable logic functions. In an embodiment, one or more or portions of feature generator (encoder) 111 and visual analytics extractor (decoder) 112 are implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of feature generator (encoder) 111 and visual analytics extractor (decoder) 112 are implemented via an application specific integrated circuit (ASIC). The ASIC may include an integrated circuitry customized to perform the operations discussed herein. Camera 1004 may include any camera having any suitable lens and image sensor and/or related hardware for capturing images or video for input to a CNN as discussed herein.

Returning to discussion of FIG. 9, process 900 begins at operation 901, where a first input volume corresponding to a first input image having a first modality and a second input volume corresponding to a second input image having a second modality are received such that the first and second modalities providing different visual information for a same scene. As discussed, the first and second input volumes may be feature volumes from a prior layer of a network or the first and second input volumes may be the first and second input images (or downsampled versions, preprocessed versions, etc.). The first and second images may correspond to any first and second modalities discussed herein such that the first and second images may include a color image, grayscale image, depth image, shade image, disparity image (or disparity map), shade image, normal data image, texture data image, edge data image, or motion vector image. The first and second input volumes may include any characteristics discussed herein. For example, the first and second input volumes may each include a number of feature maps.

Processing continues at operation 902, where a convolutional layer and a first batch normalization layer are applied to the first input volume to generate a first output volume and at operation 903, where the convolutional layer and a second batch normalization layer are applied to the second input volume to generate a second output volume. Notably, the same convolutional layer is applied to both the first and second input volumes while independent first and second batch normalization layers (one for each modality) are applied subsequent to the shared convolutional layer. Notably, the convolutional layer parameters are the same or largely the same and are trained together while the batch normalization parameters are independent and are trained separately. In some embodiments, the first batch normalization layer includes first batch normalization layer parameters and the second batch normalization layer includes second batch normalization layer parameters trained separately from the first activation parameters.

Processing continues at operation 904, where bidirectional fusion for the first and second modalities is provided. In some embodiments, where bidirectional fusion is not implemented, operation 904 may be bypassed. Such bidirectional fusion may be employed using any suitable technique or techniques such that features are fused in both directions with respect to the first and second modalities. In some embodiments, bidirectional fusion for the first and second modalities is provided by combining first features from the first output volume and second features from the second output volume or a third input volume corresponding to the second modality to generate a first fused input volume corresponding to the first modality for input to a second convolutional layer and combining third features from the second output volume and fourth features from the first output volume or a fourth output volume corresponding to the first modality to generate a second fused input volume corresponding to the second modality for input to the second convolutional layer. In some embodiments, the first features comprise first feature maps from the first output volume and the second features comprise second feature maps from the second output volume such that the first fused input volume include a concatenation of the first and second feature maps.

In some embodiments, the bidirectional fusion includes cross-modality channel shuffle techniques as discussed herein. n some embodiments, the first features comprise first feature maps from the first output volume and the second features comprise second feature maps from the second output volume such that the first fused input volume include a concatenation of the first and second feature maps. In some embodiments, the first output volume includes a first set of feature maps in an order, the second output volume comprises a second set of feature maps in the order, and the first fused input volume comprises the first and second feature maps in the order. In some embodiments, the third features comprise third feature maps from the second output volume and the fourth features comprises fourth feature maps from the first output volume, the second fused input volume comprising a concatenation of the third and fourth feature maps in the order.

In some embodiments, the bidirectional fusion includes modality-specific pixel shift feature fusion techniques (i.e., including pixel shift and add operations) as discussed herein. In some embodiments, the first fused input volume comprises sums of first feature maps from the first output volume and pixel-wise shifted versions of second feature maps from the second output volume or the third input volume. In some embodiments, the pixel-wise shifted versions of the second feature maps comprise a third feature map shifted in a horizontal direction and a fourth feature map shifted in a vertical direction. In some embodiments, the second fused input volume comprises sums of third feature maps from the second output volume and pixel-wise shifted versions of fourth feature maps from the first output volume or the fourth input volume.

In some embodiments, operation 904 includes shuffling feature maps of the first and second output volumes to generate a third input volume corresponding to the first modality, the third input volume including first feature maps from the first output volume and second feature maps from the second output volume, pixel-wise shifting at least a subset of the first and second feature maps to generate a fourth input volume, and adding the fourth input volume and a fifth input volume to generate a sixth input volume for input to a second convolutional layer. In some embodiments, the fifth input volume comprises a third output volume from a third convolutional layer.

Processing continues at operation 905, where features corresponding to the first and second output volumes for the scene are output. Such features may be the first and second output volumes, fused feature volumes corresponding to the first and second output volumes (e.g., as generated via operation 904), subsequent feature volumes from the network or features otherwise derived from the first and second output volumes. Furthermore, such features may be used in any suitable context such as visual analysis applications. In some embodiments, process 900 further includes implementing the features in a visual analysis application to generate visual analysis image outputs corresponding to the scene. For example, the visual analysis image outputs may include scene recognition data, semantic segmentation data, image translation data, person recognition data, or object recognition data, or the like.

Various components of the systems described herein may be implemented in software, firmware, and/or hardware and/or any combination thereof. For example, various components of the systems discussed herein may be provided, at least in part, by hardware of a computing System-on-a-Chip (SoC) such as may be found in a computing system such as, for example, a smartphone. Those skilled in the art may recognize that systems described herein may include additional components that have not been depicted in the corresponding figures. For example, the systems discussed herein may include additional components such as communications modules and the like that have not been depicted in the interest of clarity. In some embodiments, a system includes a memory to store any data structure discussed herein and one or more processors to implement any operations discussed herein.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the systems discussed herein or any other module or component as discussed herein. In some embodiments, the operations discussed herein are implemented by at least one non-transitory machine readable medium including instructions that, in response to being executed on a device, cause the device to perform such operations.

As used in any implementation described herein, the term "module" or "component" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hard-wired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 11:
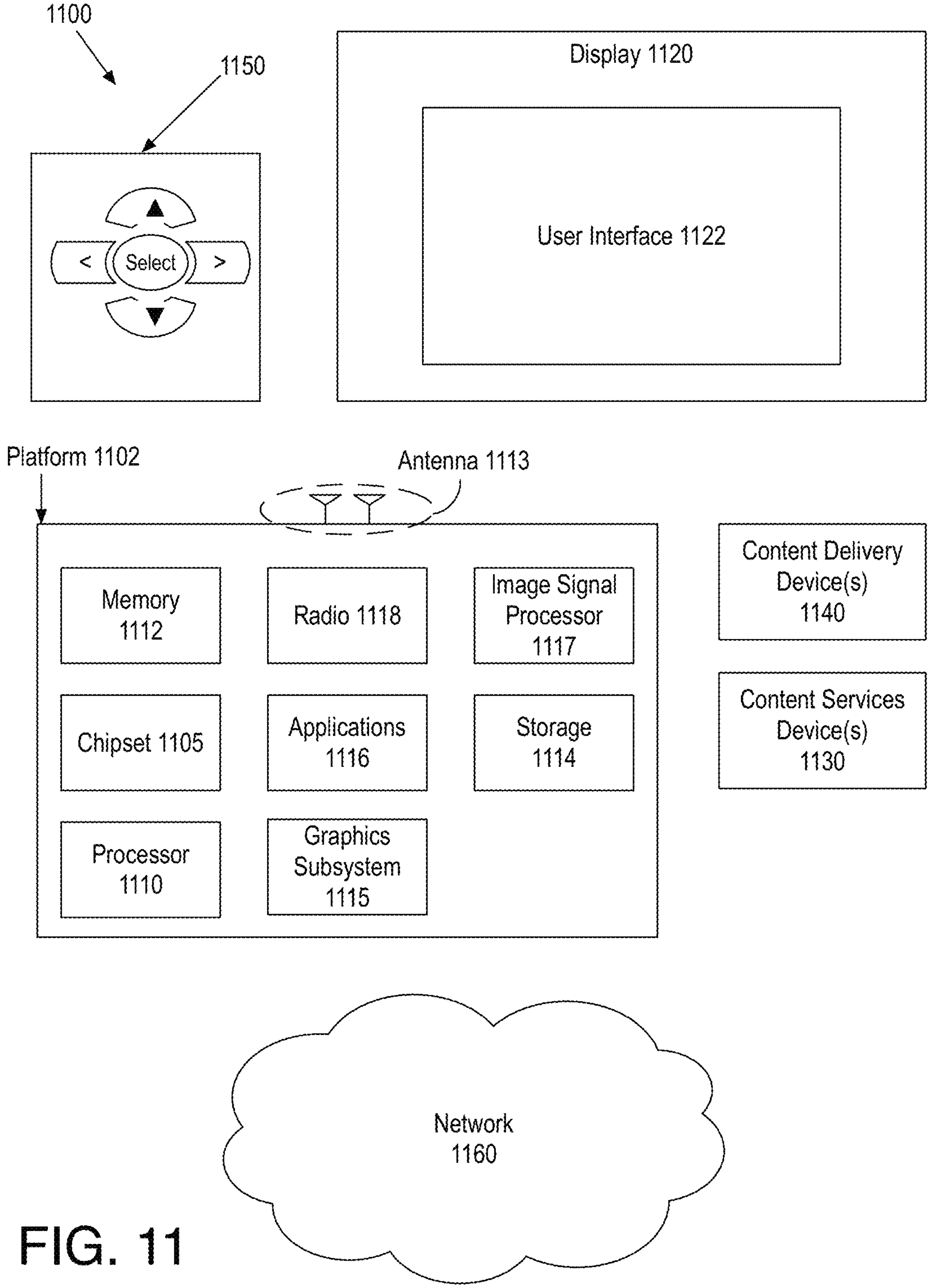
FIG. 11 is an illustrative diagram of an example system.

FIG. 11 is an illustrative diagram of an example system 1100, arranged in accordance with at least some implementations of the present disclosure. In various implementations, system 1100 may be a mobile system although system 1100 is not limited to this context. System 1100 may implement and/or perform any modules or techniques discussed herein. For example, system 1100 may be incorporated into a personal computer (PC), server, laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, smart tablet or smart television), mobile internet device (MID), messaging device, data communication device, cameras (e.g. point-and-shoot cameras, super-zoom cameras, digital single-lens reflex (DSLR) cameras), and so forth. In some examples, system 1100 may be implemented via a cloud computing environment.

In various implementations, system 1100 includes a platform 1102 coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, antenna 1113, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Image signal processor 1117 may be implemented as a specialized digital signal processor or the like used for image or video frame processing. In some examples, image signal processor 1117 may be implemented based on a single instruction multiple data or multiple instruction multiple data architecture or the like. In some examples, image signal processor 1117 may be characterized as a media processor. As discussed herein, image signal processor 1117 may be implemented based on a system on a chip architecture and/or based on a multi-core architecture.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, DisplayPort, wireless HDMI, and/or wireless HD compliant techniques. Graphics subsystem 1115 may be integrated into processor 1110 or chipset 1105. In some implementations, graphics subsystem 1115 may be a stand-alone device communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of uni-directionally or bi-directionally communicating content between content providers and platform 1102 and/display 1120, via network 1160 or directly. It will be appreciated that the content may be communicated uni-directionally and/or bi-directionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of navigation controller 1150 may be used to interact with user interface 1122, for example. In various embodiments, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In various embodiments, navigation controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
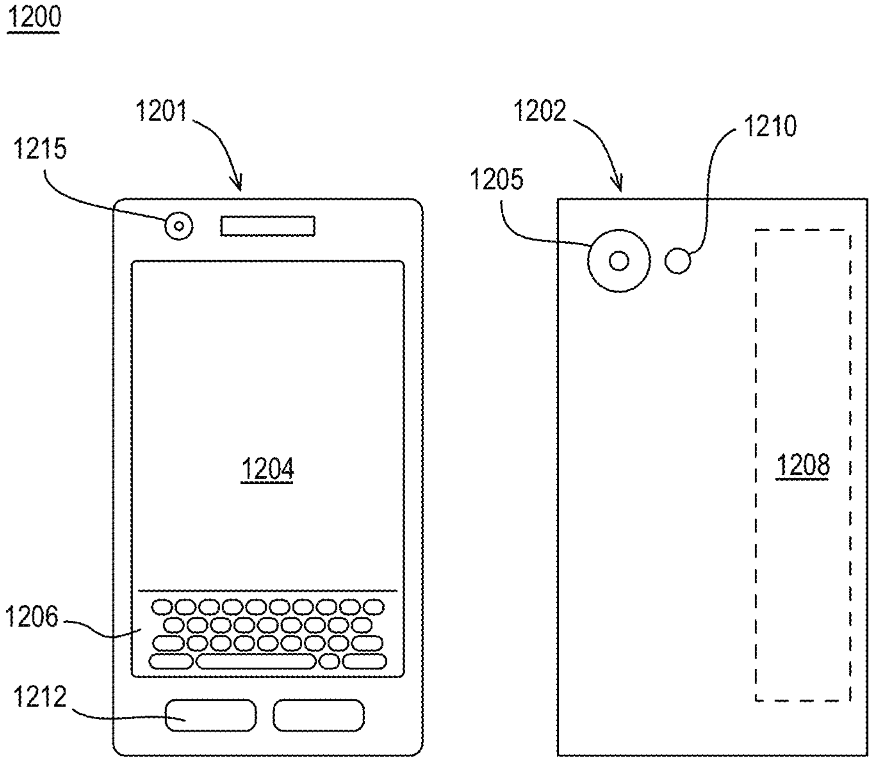
FIG. 12 illustrates an example small form factor device, all arranged in accordance with at least some implementations of the present disclosure.

As described above, system 1100 may be embodied in varying physical styles or form factors. FIG. 12 illustrates an example small form factor device 1200, arranged in accordance with at least some implementations of the present disclosure. In some examples, system 1100 may be implemented via device 1200. In other examples, other systems discussed herein or portions thereof may be implemented via device 1200. In various embodiments, for example, device 1200 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 12, device 1200 may include a housing with a front 1201 and a back 1202. Device 1200 includes a display 1204, an input/output (I/O) device 1206, camera 1215, a camera 1205, and an integrated antenna 1208. Device 1200 also may include navigation features 1212. I/O device 1206 may include any suitable I/O device for entering information into a mobile computing device. Examples for I/O device 1206 may include an alphanumeric keyboard, a numeric keypad, a touch pad, input keys, buttons, switches, microphones, speakers, voice recognition device and software, and so forth. Information also may be entered into device 1200 by way of microphone (not shown), or may be digitized by a voice recognition device. As shown, device 1200 may include camera 1205 and a flash 1210 integrated into back 1202 (or elsewhere) of device 1200 and camera 1215 integrated into front 1201 of device 1200. In some embodiments, either or both of cameras 1215, 1205 may be moveable with respect to display 1204. Camera 1215 and/or camera 1205 may be components of an imaging module or pipeline to originate color image data processed into streaming video that is output to display 1204 and/or communicated remotely from device 1200 via antenna 1208 for example. For example, camera 1215 may capture input images and eye contact corrected images may be provided to display 1204 and/or communicated remotely from device 1200 via antenna 1208.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following pertain to further embodiments.

In one or more first embodiments, a method for applying a deep neural network (DNN) for visual analysis comprises receiving a first input volume corresponding to a first input image having a first modality and a second input volume corresponding to a second input image having a second modality, the first and second modalities providing different visual information for a same scene, applying a convolutional layer and a first batch normalization layer to the first input volume to generate a first output volume, applying the convolutional layer and a second batch normalization layer to the second input volume to generate a second output volume, and outputting a plurality of features corresponding to the first and second output volumes for the scene.

In one or more second embodiments, further to the first embodiment, the first batch normalization layer comprises first batch normalization layer parameters and the second batch normalization layer comprises second batch normalization layer parameters trained separately from the first activation parameters.

In one or more third embodiments, further to the first or second embodiments, the method further comprises providing bidirectional fusion for the first and second modalities by combining first features from the first output volume and second features from the second output volume or a third input volume corresponding to the second modality to generate a first fused input volume corresponding to the first modality for input to a second convolutional layer and combining third features from the second output volume and fourth features from the first output volume or a fourth output volume corresponding to the first modality to generate a second fused input volume corresponding to the second modality for input to the second convolutional layer.

In one or more fourth embodiments, further to any of the first through third embodiments, the first features comprise first feature maps from the first output volume and the second features comprise second feature maps from the second output volume, the first fused input volume comprising a concatenation of the first and second feature maps.

In one or more fifth embodiments, further to any of the first through fourth embodiments, the first output volume comprises a first set of feature maps in an order, the second output volume comprises a second set of feature maps in the order, and the first fused input volume comprises the first and second feature maps in the order.

In one or more sixth embodiments, further to any of the first through fifth embodiments, the third features comprise third feature maps from the second output volume and the fourth features comprises fourth feature maps from the first output volume, the second fused input volume comprising a concatenation of the third and fourth feature maps in the order.

In one or more seventh embodiments, further to any of the first through sixth embodiments, the first fused input volume comprises sums of first feature maps from the first output volume and pixel-wise shifted versions of second feature maps from the second output volume or the third input volume.

In one or more eighth embodiments, further to any of the first through seventh embodiments, the pixel-wise shifted versions of the second feature maps comprise a third feature map shifted in a horizontal direction and a fourth feature map shifted in a vertical direction.

In one or more ninth embodiments, further to any of the first through eighth embodiments, the second fused input volume comprises sums of third feature maps from the second output volume and pixel-wise shifted versions of fourth feature maps from the first output volume or the fourth input volume.

In one or more tenth embodiments, further to any of the first through ninth embodiments, the method further comprises shuffling feature maps of the first and second output volumes to generate a third input volume corresponding to the first modality, the third input volume comprising first feature maps from the first output volume and second feature maps from the second output volume, pixel-wise shifting at least a subset of the first and second feature maps to generate a fourth input volume, and adding the fourth input volume and a fifth input volume to generate a sixth input volume for input to a second convolutional layer.

In one or more eleventh embodiments, further to any of the first through tenth embodiments, the fifth input volume comprises a third output volume from a third convolutional layer.

In one or more twelfth embodiments, further to any of the first through eleventh embodiments, the method further comprises implementing the plurality of features in a visual analysis application to generate visual analysis image outputs corresponding to the scene.

In one or more thirteenth embodiments, a device or system includes a memory and one or more processors to perform a method according to any one of the above embodiments.

In one or more fourteenth embodiments, at least one machine readable medium includes a plurality of instructions that in response to being executed on a computing device, cause the computing device to perform a method according to any one of the above embodiments.

In one or more fifteenth embodiments, an apparatus includes means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system comprising:

a memory to store a first input volume corresponding to a first input image and second input volume corresponding to a second input image, the first input image having a first modality and the second input image having a second modality, the first and second modalities include different visual information for a same scene;

instructions; and one or more processors to be programmed by the instructions to:

cause a shared convolutional layer and a first batch normalization layer to generate a first output volume based on at least a portion of the first input volume;

cause the shared convolutional layer and a second batch normalization layer to generate a second output volume based on the second input volume, the shared convolutional layer including a set of convolutional filter weights applied to the first input volume to generate the first output volume and applied to the second input volume, separately from the first input volume, to generate the second output volume, the same set of convolutional filter weights utilized when applied to the first input volume and the second input volume, the first batch normalization layer to include first batch parameters associated with the first modality, the second batch normalization layer including second batch parameters associated with the second modality, the second batch parameters different from the first batch parameters; and output a plurality of features corresponding to the first and second output volumes for the scene.

2. The system of claim 1, wherein the first batch normalization layer comprises first batch normalization layer parameters and the second batch normalization layer comprises second batch normalization layer parameters trained separately from the first batch normalization layer parameters, convolutional parameters of the shared convolutional layer trained using gradient information derived from both the first input volume and the second input volume such that a single set of convolutional parameters is learned for both the first modality and the second modality.

3. The system of claim 1, wherein at least one of the one or more processors is to:

combine first features from the first output volume and second features from the second output volume or a third input volume corresponding to the second modality to generate a first fused input volume corresponding to the first modality for input to a second convolutional layer; and combine third features from the second output volume and fourth features from the first output volume or a fourth output volume corresponding to the first modality to generate a second fused input volume corresponding to the second modality for input to the second convolutional layer.

4. The system of claim 3, wherein the first features comprise first feature maps from the first output volume and the second features comprise second feature maps from the second output volume, the first fused input volume comprising a concatenation of the first and second feature maps.

5. The system of claim 4, wherein the first output volume comprises a first set of feature maps in an order, the second output volume comprises a second set of feature maps in the order, and the first fused input volume comprises the first and second feature maps in the order.

6. The system of claim 5, wherein the third features comprise third feature maps from the second output volume and the fourth features comprises fourth feature maps from the first output volume, the second fused input volume comprising a concatenation of the third and fourth feature maps in the order.

7. The system of claim 3, wherein the first fused input volume comprises sums of first feature maps from the first output volume and pixel-wise shifted versions of second feature maps from the second output volume or the third input volume.

8. The system of claim 7, wherein the pixel-wise shifted versions of the second feature maps comprise a third feature map shifted in a horizontal direction and a fourth feature map shifted in a vertical direction.

9. The system of claim 7, wherein the second fused input volume comprises sums of third feature maps from the second output volume and pixel-wise shifted versions of fourth feature maps from the first output volume or a fourth input volume.

10. The system of claim 1, wherein at least one of the one or more processors is to:

shuffle feature maps of the first and second output volumes to generate a third input volume corresponding to the first modality, the third input volume comprising first feature maps from the first output volume and second feature maps from the second output volume;

pixel-wise shift at least a subset of the first and second feature maps to generate a fourth input volume; and add the fourth input volume and a fifth input volume to generate a sixth input volume for input to a second convolutional layer.

11. The system of claim 1, wherein at least one of the one or more processors is to:

implement the plurality of features in a visual analysis application to generate visual analysis image outputs corresponding to the scene.

12. A method comprising:

accessing a first input volume corresponding to a first input image having a first modality and a second input volume corresponding to a second input image having a second modality, the first and second modalities including different visual information for a same scene;

causing a shared convolutional layer and a first batch normalization layer to the first input volume to generate a first output volume based on at least a portion of the first input volume;

causing the shared convolutional layer and a second batch normalization layer to generate a second output volume based on the second input volume, the shared convolutional layer including a set of convolutional filter weights applied to the first input volume to generate the first output volume and applied to the second input volume, separately from the first input volume, to generate the second output volume, the same set of convolutional filter weights utilized when applied to the first input volume and the second input volume, the first batch normalization layer including first batch parameters associated with the first modality and the second batch normalization layer including second batch parameters associated with the second modality, the second batch parameters different from the first batch parameters; and outputting a plurality of features corresponding to the first and second output volumes for the scene.

13. The method of claim 12, comprising providing bidirectional fusion for the first and second modalities by:

combining first features from the first output volume and second features from the second output volume or a third input volume corresponding to the second modality to generate a first fused input volume corresponding to the first modality for input to a second convolutional layer; and combining third features from the second output volume and fourth features from the first output volume or a fourth output volume corresponding to the first modality to generate a second fused input volume corresponding to the second modality for input to the second convolutional layer.

14. The method of claim 13, wherein the first features comprise first feature maps from the first output volume and the second features comprise second feature maps from the second output volume, the first fused input volume comprising a concatenation of the first and second feature maps.

15. The method of claim 13, wherein the first fused input volume comprises sums of first feature maps from the first output volume and pixel-wise shifted versions of second feature maps from the second output volume or the third input volume.

16. At least one machine readable storage device comprising a plurality of instructions to cause a device to:

access a first input volume corresponding to a first input image having a first modality and a second input volume corresponding to a second input image having a second modality, the first and second modalities including different visual information for a same scene;

cause a shared convolutional layer and a first batch normalization layer to generate a first output volume based on at least a portion of the first input volume;

cause the shared convolutional layer and a second batch normalization layer to generate a second output volume based on the second input volume, the shared convolutional layer including a set of convolutional filter weights applied to the first input volume to generate the first output volume and applied to the second input volume, separately from the first input volume, to generate the second output volume, the same set of convolutional filter weights utilized when applied to the first input volume and the second input volume, the first batch normalization layer to include first batch parameters associated with the first modality and the second batch normalization layer including second batch parameters associated with the second modality, the second batch parameters different from the first batch parameters; and output a plurality of features corresponding to the first and second output volumes for the scene.

17. The at least one machine readable storage device medium of claim 16, comprising instructions to cause the device to provide bidirectional fusion for the first and second modalities by:

combining first features from the first output volume and second features from the second output volume or a third input volume corresponding to the second modality to generate a first fused input volume corresponding to the first modality for input to a second convolutional layer; and combining third features from the second output volume and fourth features from the first output volume or a fourth output volume corresponding to the first modality to generate a second fused input volume corresponding to the second modality for input to the second convolutional layer.

18. The system of claim 1, wherein at least one of the one or more processors is to perform bidirectional fusion of the first and second output volumes.

19. The system of claim 18, wherein at least one of the one or more processors is to perform the bidirectional fusion of the first and second output volumes by:

performing cross-modality channel shuffling (CMCS) that exchanges non-overlapping channel subsets between the first and second output volumes, and performing modality-specific pixel shifting (MSPS) that shifts grouped feature maps by one pixel in different spatial directions and adds the shifted feature maps into the output volume of the other modality.

20. The system of claim 1, wherein:

the shared convolutional layer is trained as a single convolutional layer for both the first modality and the second modality, convolutional parameters of the shared convolutional layer trained using gradient information derived from both the first input volume and the second input volume such that a single set of convolutional parameters is learned for both the first modality and the second modality, first model parameters for the first batch normalization layer are trained for the first modality and second model parameters for the second batch normalization layer are trained for the second modality; and the first batch normalization layer is a first layer applied to the at least the portion of the first input volume after the shared convolutional layer and the second batch normalization layer is a first layer applied to the at least the portion of the second input volume after the second input volume.

* * * * *